United States Patent
Ohto

(10) Patent No.: US 10,281,643 B2
(45) Date of Patent: May 7, 2019

(54) PLANAR ILLUMINATION APPARATUS

(71) Applicant: MINEBEA MITSUMI Inc., Nagano (JP)

(72) Inventor: Kazuki Ohto, Fukuroi (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 15/989,380

(22) Filed: May 25, 2018

(65) Prior Publication Data

US 2018/0348422 A1 Dec. 6, 2018

(30) Foreign Application Priority Data

Jun. 2, 2017 (JP) ................. 2017-110227

(51) Int. Cl.
  *F21V 9/00* (2018.01)
  *F21V 8/00* (2006.01)
(52) U.S. Cl.
  CPC ......... *G02B 6/0073* (2013.01); *G02B 6/0091* (2013.01); *F21V 2200/20* (2015.01)
(58) Field of Classification Search
  CPC .. G02B 6/0073; G02B 6/0091; F21V 2200/20
  See application file for complete search history.

(56) References Cited

U.S. PATENT DOCUMENTS

| 2015/0153507 | A1* | 6/2015 | Momose | G02F 1/1336 |
| | | | | 349/65 |
| 2018/0067252 | A1* | 3/2018 | Edamitsu | G02B 6/0046 |
| 2018/0156958 | A1* | 6/2018 | Yoshida | G02B 6/0018 |
| 2018/0164484 | A1* | 6/2018 | Tanaka | G02B 6/009 |

FOREIGN PATENT DOCUMENTS

JP 2005-259374 A 9/2005

* cited by examiner

*Primary Examiner* — Anh T Mai
*Assistant Examiner* — Glenn D Zimmerman
(74) *Attorney, Agent, or Firm* — Pearne & Gordon LLP

(57) ABSTRACT

A planar illumination apparatus according to an embodiment includes a light guide plate, a light source, a frame, a first support member, a first adhesive member, a second support member, and a second adhesive member. The light guide plate has a light extraction surface and a light entering side face. The light source is arranged on the light entering side-face side. The frame has a floor face, and houses the light guide plate and the light source. The first support member supports the light guide plate from the floor face side of the frame. The first adhesive member causes the light guide plate and the first support member to adhere to each other. The second support member supports the light source from the floor face side of the frame. The second adhesive member causes the light source and the second support members to adhere to each other.

6 Claims, 4 Drawing Sheets

PLANAR ILLUMINATION APPARATUS

CROSS-REFERENCE TO RELATED APPLICATION

The present application claims priority to and incorporates by reference the entire contents of Japanese Patent Application No. 2017-110227 filed in Japan on Jun. 2, 2017.

BACKGROUND OF THE INVENTION

1. Field of the Invention

The present invention relates to a planar illumination apparatus.

2. Description of the Related Art

Conventionally, a flexible printed circuit (FPC) on which light emitting diodes (LED) are mounted is fixed to a light guide plate with the use of a pressure sensitive adhesive double coated tape. In this case, in order to improve light use efficiency, the pressure sensitive adhesive double coated tape is arranged in an area other than the front sides of the respective LEDs (see Japanese Laid-open Patent Publication No. 2005-259374).

However, in recent years, there has been a drawback that demands for high luminance (increase in the number of LEDs) or frame width reduction with respect to a planar illumination apparatus reduce the adhering area of a light guide plate with the pressure sensitive adhesive double coated tape, and it is impossible to ensure sufficient adhesive strength.

Accordingly, in order to ensure the adhesive strength, it is possible to use a fixing member higher in adhesive strength than the pressure sensitive adhesive double coated tape. However, in this case, when a defect of the light guide plate is found after the planar illumination apparatus is assembled, it is not easy to replace only the light guide plate and hence, there has been a drawback that there is no way but to discard both the light guide plate and the LEDs thus increasing the cost of manufacturing the planar illumination apparatus.

SUMMARY OF THE INVENTION

A planar illumination apparatus according to an embodiment includes a light guide plate, a light source, a frame, a first support member, a first adhesive member, a second support member, and a second adhesive member. The light guide plate has a light extraction surface and a light entering side face on which light is incident, and is a side face that intersects with the light extraction surface. The light source is arranged on the light entering side face side of the light guide plate, and has a light-emitting surface that emits light to be incident on the light entering side face. The frame has a floor face, and houses the light guide plate and the light source. The first support member supports the light guide plate from the floor face side of the frame. The first adhesive member causes the light guide plate and the first support member to adhere to each other. The second support member supports the light source from the floor face side of the frame. The second adhesive member causes the light source and the second support members to adhere to each other.

DETAILED DESCRIPTION OF THE PREFERRED EMBODIMENTS

Figure 1:
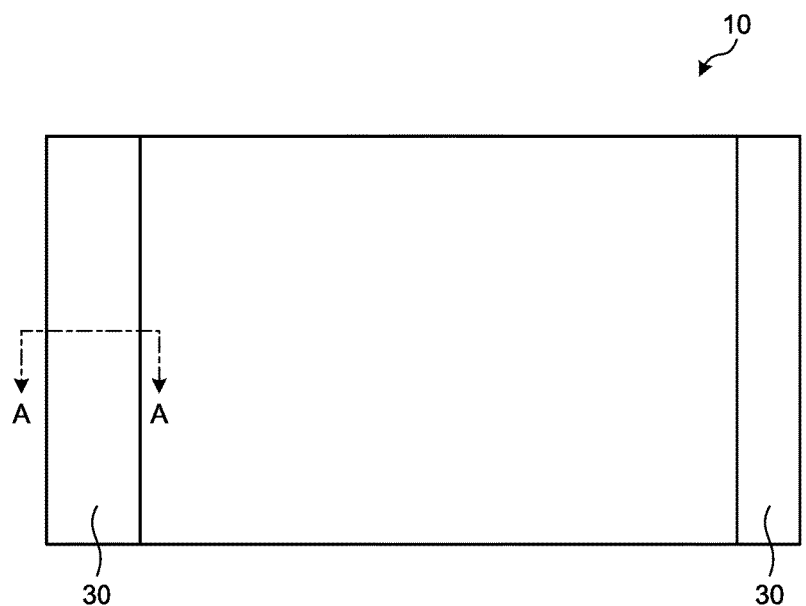
FIG. 1 is a plan view illustrating one example of the external appearance of a planar illumination apparatus according to an embodiment.

Hereinafter, a planar illumination apparatus according to an embodiment is explained with reference to drawings. Here, the present invention is not limited to the embodiment described below. Furthermore, in the drawings, a dimensional relation between respective elements, or the dimensional ratio of the respective elements may be different from actual dimensions. Furthermore, in the relation between the drawings also, there may be a case that the dimensional relations or the dimensional ratios illustrated in the respective drawings are different from each other.

First, the outline of the planar illumination apparatus according to the embodiment is explained in conjunction with FIG. 1. FIG. 1 is a front view illustrating one example of the external appearance of the planar illumination apparatus according to the embodiment. In the example illustrated in FIG. 1, a planar illumination apparatus 10 according to the embodiment emits light from a light-emitting region (also referred to as "effective area") that is not covered with shielding sheets 30. That is, the shielding sheets 30 specify the effective area. The planar illumination apparatus 10 according to the present embodiment is used as a back light of a liquid crystal display. The liquid crystal display is, for example, used for a smart phone.

In the planar illumination apparatus 10 according to the embodiment, a light emitting diode (LED) 13 that is a light source, and a light guide plate 14 are fixed to a floor face-11b side (see FIG. 3) of a frame 11 that houses the LED 13 and the light guide plate 14, with the use of respective adhesive members different from each other.

Figure 2:
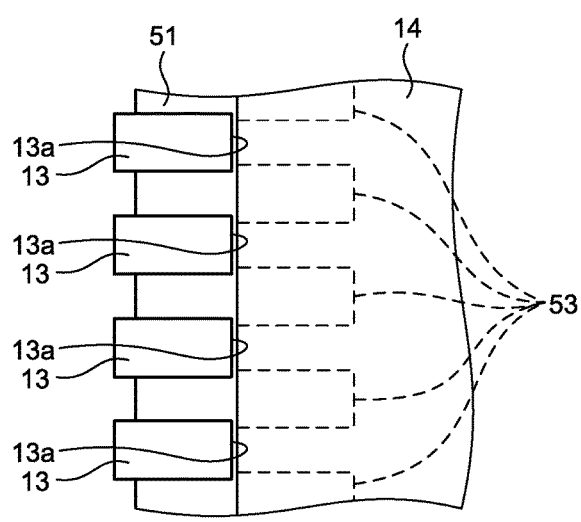
FIG. 2 is a view illustrating the outline of a first adhesive member and a second adhesive member.

Here, the detail of above is explained in conjunction with FIG. 2. FIG. 2 is a view illustrating the outline of a first adhesive member and a second adhesive member. As illustrated in FIG. 2, the planar illumination apparatus 10 according to the embodiment is provided with a plurality of LEDs 13 and the light guide plate 14, and the LEDs 13 adhere to a second adhesive member 51.

On the other hand, the light guide plate 14 is, in the vicinity of a light entering side face 14a, fixed with the use of first adhesive members 53 formed into discrete island-like parts (into strip-like parts) each projecting toward the light guide plate-14 side from between the LEDs 13. That is, the first adhesive members 53 are arranged only in respective areas except other areas located in the light emission directions of the respective LEDs 13 in a spaced-apart manner. Accordingly, the light emitted from a light-emitting surface 13a of each of the LEDs 13 is incident on the light guide plate 14 and thereafter, guided to the inside of the light guide plate 14 without being absorbed in the first adhesive member 53.

That is, in the planar illumination apparatus 10 according to the embodiment, the first adhesive members 53 are arranged only in the respective areas except the other areas located in the light emission directions of the respective LEDs 13 thus preventing the lowering of light emission efficiency due to the first adhesive member 53.

Figure 3:
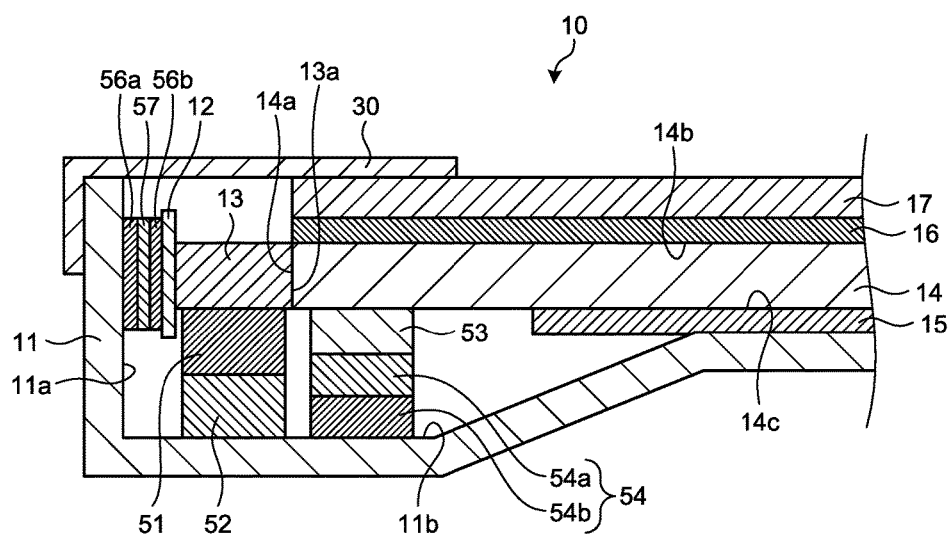
FIG. 3 is a schematic sectional view taken along a line A-A in FIG. 1.

Next, a sectional view taken along a line A-A in FIG. 1 is explained in conjunction with FIG. 3. FIG. 3 is a schematic sectional view taken along the line A-A in FIG. 1. As illustrated in FIG. 3, the planar illumination apparatus 10 is provided with the frame 11, a flexible printed circuit (FPC) 12, the LEDs 13, the light guide plate 14, a reflective sheet 15, a diffusion sheet 16, and a prism sheet 17.

The frame 11 is a member that houses the FPC 12, the LEDs 13, the light guide plate 14, the reflective sheet 15, the diffusion sheet 16, the prism sheet 17, and the like. The frame 11 is, for example, a sheet-metal frame made of stainless steel that is high in rigidity. Furthermore, the frame 11 has a side wall 11a and the floor face 11b.

The FPC 12 is a board whose LED 13-side principal surface mounts the LEDs 13 thereon. The FPC 12 has a predetermined wiring pattern (not illustrated in the drawings) that is formed therein, and electric power supplied from an external power source (not illustrated in the drawings) is supplied to the LEDs 13 via the wiring pattern thus causing the LEDs 13 to emit light.

Furthermore, a principal surface opposite to the LED-13 side of the FPC 12 arranges thereon fixing members 56a, 56b and a base material 57 that are used for fixing the FPC 12 to the side wall 11a of the frame 11. Each of the fixing members 56a, 56b is, for example, an adhesive layer that constitutes a double-sided tape, and fixes the FPC 12 to the side wall 11a by way of the base material 57. Here, each of the fixing members 56a, 56b is not limited to the adhesive layer, and may be an adhesive, such as a silicone resin or an acrylate resin. The base material 57 functions as a spacer that adjusts the respective positions of the FPC 12 and the LEDs 13. Furthermore, the base material 57 is a polyethylene terephthalate (PET) resin, or the like.

The LED 13 is a point-like light source (punctiform light source). The LED 13 is, for example, a pseudo white LED constituted of a blue LED and a yellow fluorescent substance. The LED 13 is what is called a top-view type LED that is formed in an approximately rectangular parallelepiped shape as a whole, and has the light-emitting surface 13a located opposite to the face abutting on the FPC 12 when the LED 13 is mounted on the FPC 12.

In the present embodiment, the plurality of LEDs 13 are used, and in a state that the light-emitting surface 13a faces the light entering side face 14a of the light guide plate 14, the LEDs 13 are arranged along the light entering side face 14a in a spaced-apart manner with a predetermined distance therebetween (or in a close contact manner). Furthermore, each of the plurality of LEDs 13 emits light toward the light entering side face 14a of the light guide plate 14. In this manner, each of the LEDs 13 emits light to be incident on the light entering side face 14a of the light guide plate 14. Furthermore, each of the LEDs 13 is, for example, fixed to the FPC 12 by soldering. That is, the LED 13 is fixed to the side wall 11a of the frame 11 by way of the FPC 12.

The light guide plate 14 is formed of a transparent material (polycarbonate resin, for example) into a rectangular shape as viewed in a top view. The light guide plate 14 has the light entering side face 14a, a light extraction surface 14b, and a light reflection surface 14c. The light entering side face 14a is arranged at a position such that the light entering side face 14a faces the light-emitting surface 13a of the LED 13 in an opposed manner, and the light emitted from the LED 13 is incident on the light entering side face 14a. The light entering side face 14a is a side face that intersects with the light extraction surface 14b; that is, the light entering side face 14a is a side face on which the light emitted from the LED 13 is incident. The light extraction surface 14b is a light radiating surface from which the light received from the light entering side face 14a is radiated. Furthermore, an optical path change pattern constituted of a plurality of dots is, for example, formed in a part on the light reflection surface-14c side of the light guide plate 14. The optical path change pattern is formed thus changing the direction of light traveling in the inside of the light guide plate 14, and the light is radiated from the light extraction surface 14b.

The reflective sheet 15 reflects light leaked from the light reflection surface 14c of the light guide plate 14 to return the light to the light guide plate 14. Furthermore, the reflective sheet 15 is fixed to the floor face 11b of the frame 11 with the use of an adhesive member, such as a double-sided tape (not illustrated in the drawings).

The diffusion sheet 16 is arranged on the light extraction surface-14b side of the light guide plate 14, and diffuses the light radiated from the light extraction surface 14b. The prism sheet 17 is arranged on the surface of the diffusion sheet 16 that is opposite to the light guide plate 14, controls the distribution of the light diffused through the diffusion sheet 16, and radiates the distribution-controlled light.

Here, in the present embodiment, the light guide plate 14 and the LED 13 are supported from the floor face-11b side of the frame 11 by respective members different from each other. To be more specific, the light guide plate 14 is supported by a first support member 54, and the LED 13 is supported by a second support member 52.

Furthermore, the light guide plate 14 and the first support member 54 adhere to each other with the use of the first adhesive member 53, and the LED 13 and the second support member 52 adhere to each other with the use of a second adhesive member 51. For example, the first adhesive member 53 is a thermocompression-bonding sheet, and the second adhesive member 51 is a double-sided tape lower in adhesive strength (per unit area) than the thermocompression-bonding sheet. That is, the LED 13 and the light guide plate 14 adhere to the respective support members with the use of the respective adhesive members different from each other, and independently supported on the floor face-11b side of the frame 11.

Due to such constitution, in the embodiment, in detaching the light guide plate 14, it is possible to detach only a light guide plate 14-side unit (including the first adhesive member 53 and the first support member 54). Namely, in the embodiment, in detaching the light guide plate 14, it is possible to prevent the LED 13 from being detached together with the light guide plate-14 side unit.

Furthermore, the first support member 54 is provided with a first base material 54a and a third adhesive member 54b. The first base material 54a functions as what is called a spacer that adjusts the height from the floor face 11b to the light guide plate 14. Here, the first base material 54a is, for example, composed of PET resin. The third adhesive member 54b is, for example, a double-sided tape, with which the floor face 11b and the first base material 54a adhere to each other. That is, the light guide plate 14 is fixed on the floor face 11b by way of the first support member 54.

The second support member 52 is composed of PET resin, and fixed on the floor face-11b side of the frame 11. In the present embodiment, the second support member 52 functions as a spacer that adjusts the height from the floor face 11b to each of the LEDs 13. That is, the first support member 54 and the second support member 52 are capable of uniforming the respective heights from the floor face 11b to the LED 13 and the light guide plate 14. Accordingly, it is possible to arrange the LED 13 and the light guide plate 14 so that the LED 13 and the light guide plate 14 can be flush with each other. Thus, it is possible to stabilize optical coupling efficiency between the LED 13 and the light guide plate 14. An adhesive member may be provided between the second support member 52 and the floor face 11b, by which the second support member 52 and the floor face 11b adhere to each other.

Figure 4:
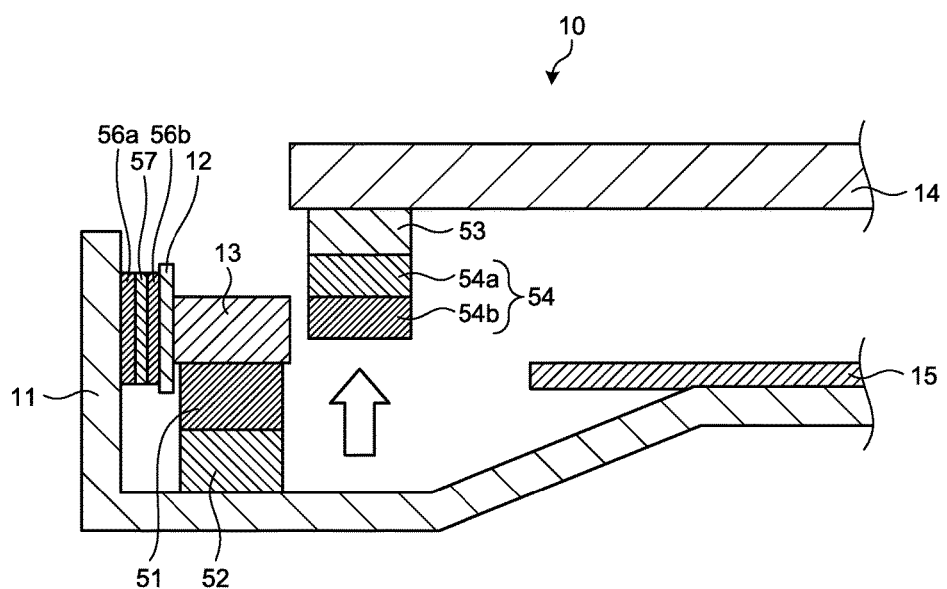
FIG. 4 is a schematic view in the case of detaching a light guide plate.

Next, the explanation is made with respect to the case where the light guide plate 14 is detached, in conjunction with FIG. 4. FIG. 4 is a schematic view in the case of detaching the light guide plate 14. FIG. 4 illustrates a situation where the diffusion sheet 16, the prism sheet 17, the shielding sheet 30, and the like are previously detached.

As illustrated in FIG. 4, when the light guide plate 14 is detached; that is, when the light guide plate 14 is lifted to the light extraction surface-14b side of the light guide plate 14, the light guide plate 14, the first adhesive member 53, and the first support member 54 are separated from the floor face 11b. That is, the first adhesive member 53 is an adhesive member higher in adhesive strength per unit area than the third adhesive member 54b is.

Furthermore, as mentioned above, although the first adhesive members 53 are formed into discrete island-like parts, the third adhesive member 54b is not required to be formed into discrete island-like parts and hence, the third adhesive member 54b is formed into a continuous body thus ensuring a large adhesion area between the third adhesive member 54b and the floor face 11b of the frame 11.

Consequently, it is possible for the third adhesive member 54b to ensure sufficient adhesive strength when a double-sided tape having comparatively low adhesive strength per unit area, or the like is used. In this manner, to consider a case where the third adhesive member 54b is a double-sided tape, when a defect in the light guide plate 14 is found, it is possible to detach the light guide plate 14 from the floor face 11b of the frame 11 by worker's power.

Furthermore, a thermocompression-bonding sheet higher in adhesive strength per unit area than the third adhesive member 54b is, for example, used as the first adhesive member 53 thus ensuring adhesive strength of the first adhesive member 53 so that the first adhesive member 53 can withstand an impact or the like, when the first adhesive members 53 are formed into discrete island-like parts. In this manner, the first adhesive member 53 and the third adhesive member 54b are used in combination with each other to fix the light guide plate 14 from the floor face-11b side of the frame 11 thus easily detaching the light guide plate 14, and ensuring the adhesive strength. Due to such constitution, when an impact or the like is applied to the planar illumination apparatus 10, it is possible to prevent positional deviation of the light guide plate 14. Namely, it is possible to prevent the lowering of the light emission efficiency due to the positional deviation between the light guide plate 14 and the LED 13.

Furthermore, as described above, the first adhesive member 53 is a thermocompression-bonding sheet, and the third adhesive member 54b is a double-sided tape. That is, each of the first adhesive member 53 and the third adhesive member 54b is a sheet-like adhesive member. In this manner, the light guide plate 14 is fixed to the floor face 11b without using an adhesive thus also simplifying the assembling process of the light guide plate 14 in comparison with the case where the light guide plate 14 is fixed to the floor face 11b with the use of the adhesive.

Figure 5:
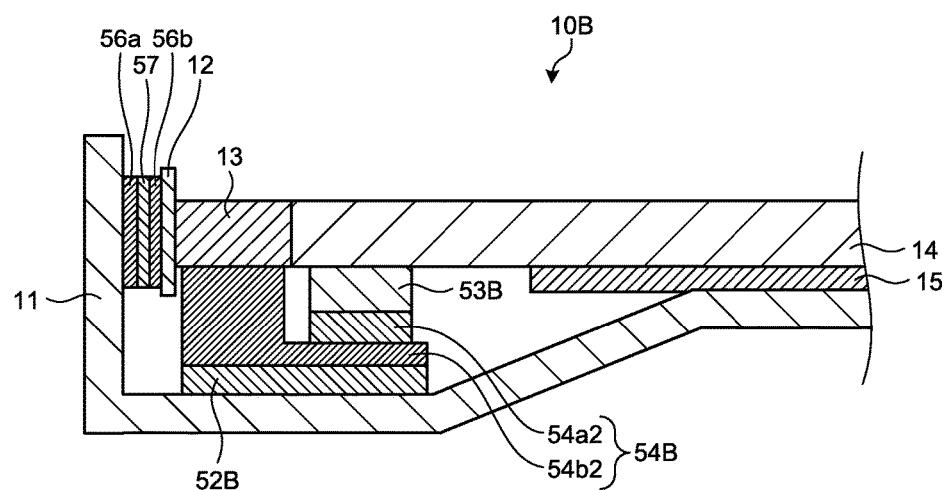
FIG. 5 is a schematic sectional view of a planar illumination apparatus according to a first modification.
Figure 6:
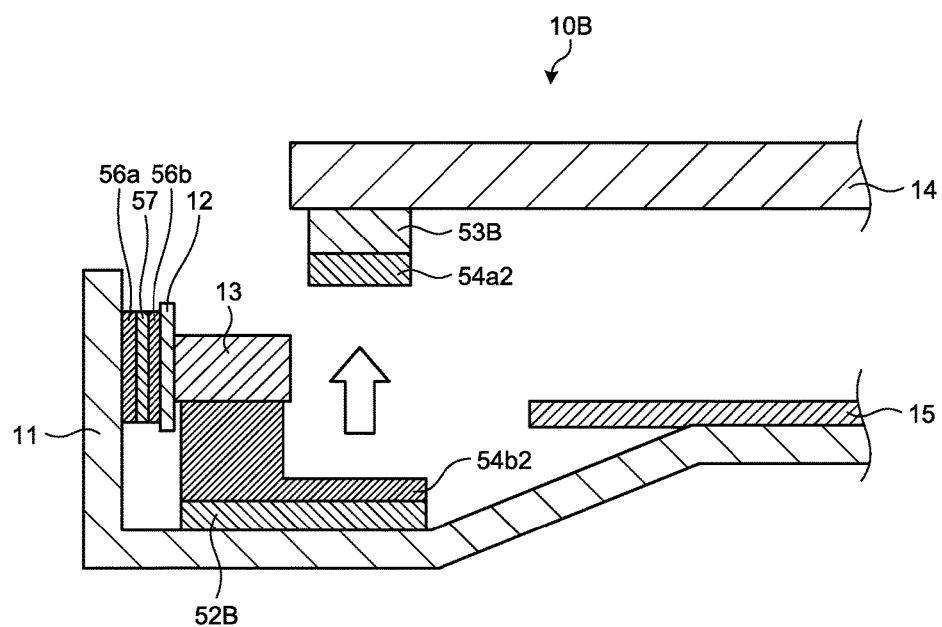
FIG. 6 is a schematic view in the case of detaching the light guide plate in the first modification.

Next, a planar illumination apparatus 10B according to a first modification is explained in conjunction with FIG. 5 and FIG. 6. FIG. 5 is a schematic sectional view of the planar illumination apparatus 10B according to the first modification. Furthermore, FIG. 6 is a schematic view in the case of detaching the light guide plate 14 in the first modification. FIG. 5 corresponds to the schematic sectional view taken along the line A-A in FIG. 1, in the same manner as FIG. 3.

The planar illumination apparatus 10B according to the first modification differs from the above-mentioned planar illumination apparatus 10 in that the second support member 52 illustrated in FIG. 3 corresponds to a second support member 52B extending to the lower area of a first support member 54B, and the third adhesive member 54b corresponds to a third adhesive member 54b2 formed in a step-like shape.

The second support member 52B is, for example, composed of a PET resin formed in a sheet-like shape, and extends to a position overlapping with the first support member 54B as viewed in the plan view of the light extraction surface 14b of the light guide plate 14, to support the first support member 54B from the floor face-11b side of the frame 11. Furthermore, the third adhesive member 54b2 causes the second support member 52B and the LED 13 to adhere to each other, and causes the second support member 52B and a first base material 54a2 to adhere to each other. That is, in the planar illumination apparatus 10B according to the first modification, the third adhesive member 54b2 also functions as the second adhesive member 51 illustrated in FIG. 3. Furthermore, the third adhesive member 54b2 is, for example, a double-sided tape formed in such a manner that a part of the double-sided tape that is located below the LED 13 is different in thickness from the other part of the double-sided tape that is located below the light guide plate 14.

In this manner, the second support member 52B supports the first base material 54a2 from the floor face-11b side of the frame 11 by way of the third adhesive member 54b2. Namely, the height of the light guide plate 14 from the floor face 11b is adjusted by the first base material 54a2, the second support member 52B, or the like. Due to such constitution, it is possible to reduce the respective thicknesses of a first adhesive member 53B and the first base material 54a2 in comparison with the case of the first adhesive member 53 and the first base material 54a. That is, in the planar illumination apparatus 10B according to the first modification, it is possible to fix the light guide plate 14 with the use of thin members combined with each other thus lowering the error of an attachment height or the like in attaching the light guide plate 14.

Furthermore, in the planar illumination apparatus 10B according to the first modification, when the light guide plate 14 is detached, the light guide plate 14, the first adhesive member 53B, and the first base material 54a2 can be detached from the third adhesive member 54b2. That is, the first adhesive member 53B is higher in adhesive strength than the third adhesive member 54b2 thus detaching only the light guide plate 14-side unit. Here, a part of the third adhesive member 54b2 that is located below the plurality of LEDs 13 and another part of the third adhesive member 54b2 that is located below the light guide plate 14 are not required to be integrally formed, and may be formed separately from each other.

Figure 7:
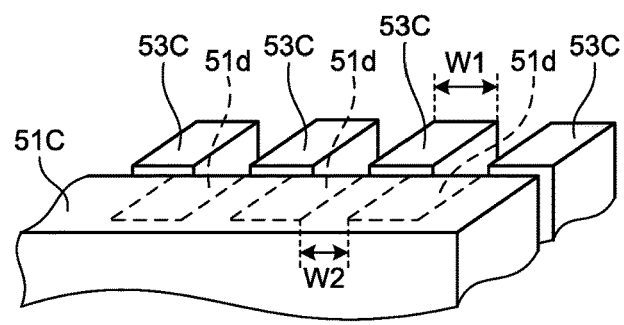
FIG. 7 is a schematic view illustrating an arrangement relation between a first adhesive member and a second adhesive member according to a second modification.
Figure 8:
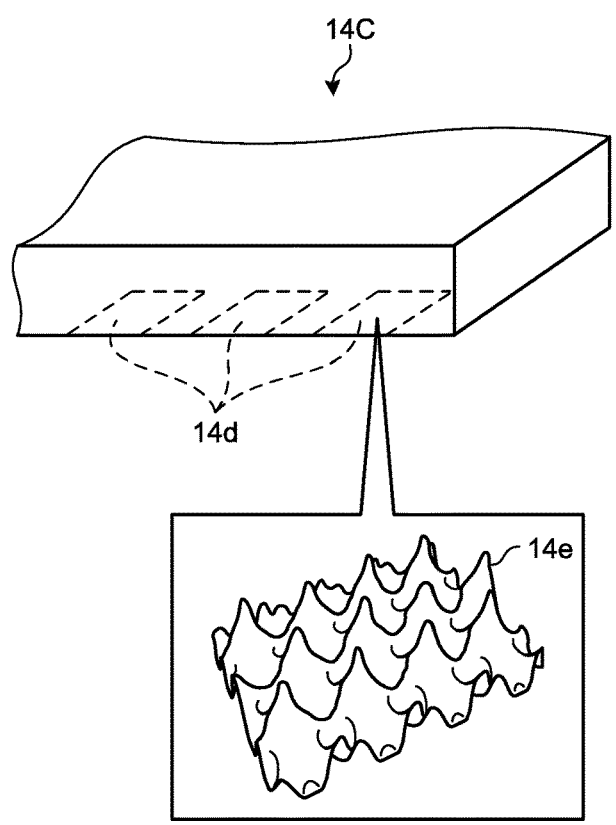
FIG. 8 is a schematic view illustrating a light guide plate according to the second modification.

Next, a second modification is explained in conjunction with FIG. 7 and FIG. 8. FIG. 7 is a schematic view illustrating an arrangement relation between first adhesive members 53C and a second adhesive member 51C according to the second modification. FIG. 8 is a schematic view illustrating a light guide plate 14C according to the second modification. In FIG. 7, the mounting position 51d of each of the LEDs 13 with respect to the second adhesive member 51C is indicated by a dashed line.

As illustrated in FIG. 7, the first adhesive members 53C according to the second modification are formed into discrete island-like parts (into strip-like parts) each projecting toward the light guide plate-14C side from between the mounting positions 51d. Furthermore, the light guide plate 14C is placed on the first adhesive members 53C.

Here, when the number of the LEDs 13 to be used is increased, the area of the first adhesive members 53C is reduced depending on the number of the LEDs 13 thus reducing the area for fixing the light guide plate 14C on the floor face-11b side of the frame 11. That is, the position of the light guide plate 14C is easily deviated from the first adhesive member 53C.

Accordingly, in the second modification, a width W1 of the first adhesive member 53 is made larger than an interval W2 at which the LEDs 13 are arranged. Due to such constitution, it is possible to increase the contact area of the light guide plate 14C with the first adhesive member 53C thus strongly fixing the light guide plate 14C on the first adhesive member 53C.

In addition, in the second modification, as illustrated in FIG. 8, a bottom surface 14d of the light guide plate 14C that is brought into contact with the first adhesive member 53C has uneven parts 14e each of which is formed in an uneven shape. In this manner, the bottom surface 14d forms the uneven parts 14e thereon thus further increasing the contact area of the light guide plate 14C with the first adhesive member 53C, and more strongly fixing the light guide plate 14C to the first adhesive member 53C.

Furthermore, a projecting portion (a portion projecting to the first adhesive member-53C side) of each of the uneven parts 14e is formed in a spike shape, and the projecting portion bites into the first adhesive member 53C thus also functioning as an antislip member. Due to such constitution, the uneven parts 14e achieve the advantageous effect that prevents the positional deviation of the light guide plate 14C on the first adhesive member 53C.

That is, in the second modification, the light guide plate 14C is firmly fixed to the first adhesive member 53C thus preventing the lowering of light emission efficiency and the deterioration of luminance distribution due to the positional deviation between the LED 13 and the light guide plate 14C.

Here, in the above-mentioned example, although the explanation is made with respect to the case where the width W1 is larger than the interval W2, the width W1 may be equal to or smaller than the interval W2. Furthermore, the shape of the uneven part 14e is not limited to the spike shape, and the uneven part 14e imposes no restriction on the shape thereof provided that the bottom surface 14d of the light guide plate 14C is formed in an uneven shape. In addition, the first adhesive member 53C imposes no restriction on the type thereof, and may be a double-sided tape, or the like.

Furthermore, although the explanation is made with respect to the case where the LED 13 and the light guide plate 14 are fixed on the first adhesive member 53C and the second adhesive member 51C, respectively, the present invention is not limited to this example. For example, the second adhesive member 51C may be formed in a comb-like shape having comb blade-like parts each projecting from between the LEDs 13 to the light guide plate-14C side, and the light guide plate 14 may be placed on the projecting parts of the second adhesive member 51C. Even in this case, the bottom surface of the light guide plate 14C that is brought into contact with the second adhesive member 51C forms the uneven parts 14e thereon thus firmly fixing the light guide plate 14C to the second adhesive member 51C.

As mentioned above, in the planar illumination apparatus 10 according to the embodiment, the light guide plate 14 has the light extraction surface 14b and the light entering side face 14a on which light is incident, the light entering side face 14a being configured to constitute a side face intersecting with the light extraction surface 14b. A light source 13 (LED) is arranged on the light entering side face 14a, and has the light-emitting surface 13a that emits light to be incident on the light entering side face 14a. The frame 11 has the floor face 11b, and houses the light guide plate 14 and the light source 13. The first support member 54 supports the light guide plate 14 from the floor face 11b-side of the frame 11. The first adhesive member 53 causes the light guide plate 14 and the first support member 54 to adhere to each other. The second support member 52 supports the light source 13 from the floor face 11b-side of the frame 11. The second adhesive members 51 causes the light source 13 and the second support member 52 to adhere to each other. Consequently, it is possible to easily replace the light guide plate 14.

Here, in the embodiment mentioned above, although the explanation is made with respect to the case where the light guide plate 14 and the LED 13 are supported by the first support member 54 and the second support member 52, respectively, from the floor face-11b side of the frame 11, the present invention is not limited to this example. That is, the light guide plate 14 and the LED 13 may directly adhere to the floor face 11b with the use of the first adhesive members 53 and the second adhesive member 51, respectively. That is, the first support member 54 and the second support member 52 may be omitted.

Furthermore, in the embodiment mentioned above, although the explanation is made with respect to the case where each of the plurality of LEDs 13 is a top view type LED, each of the LEDs 13 may be a side view type LED. In addition, in replace of the LEDs 13 that constitute a plurality of punctiform light sources, a light source (linear light source) constituted of the plurality of LEDs 13 integrally formed in a linearly aligned manner may be used. To be more specific, for example, there may be used a linear light source in which a plurality of LED chips are mounted on a board formed in a long strip shape, and the plurality of LED chips are integrally covered with sealing resin. In this case, it is possible to substitute the light source according to the present invention for the LED chip.

According to one embodiment of the present invention, it is possible to ensure the adhesive strength and, at the same time, it is possible to easily replace each member.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A planar illumination apparatus comprising:
a light guide plate having a light extraction surface and a light entering side face on which light is incident, the light entering side face being configured to constitute a side face intersecting with the light extraction surface;
a light source arranged on the light entering side face side of the light guide plate, the light source having a light-emitting surface configured to emit light to be incident on the light entering side face;
a frame having a floor face, the frame being configured to house the light guide plate and the light source;
a first support member configured to support the light guide plate from the floor-face side of the frame;
a first adhesive member configured to cause the light guide plate and the first support member to adhere to each other;
a second support member configured to support the light source from the floor-face side of the frame; and
a second adhesive member configured to causes the light source and the second support member to adhere to each other.

2. The planar illumination apparatus according to claim 1, wherein
the first support member includes
a first base material and
a third adhesive member configured to cause the first base material to adhere to the floor-face side of the frame, and
the first adhesive member is higher in adhesive strength per unit area than the third adhesive member.

3. The planar illumination apparatus according to claim 1, wherein
the first adhesive member is a thermocompression-bonding sheet.

4. The planar illumination apparatus according to claim 1, wherein
the second support member extends to a position overlapping with the first support member as viewed in the plan view of the light extraction surface, and supports the first support member from the floor-face side of the frame, and
the second adhesive member causes the light source and the second support member to adhere to each other while adhering the first support member and the second support member to each other.

5. The planar illumination apparatus according to claim 1, wherein
the first adhesive member is arranged in an area other than an area located in the light emission direction of the light source, and
the light guide plate has an uneven part formed in an uneven shape on the bottom surface of the light guide plate, the bottom surface being brought into contact with the first adhesive member.

6. The planar illumination apparatus according to claim 2, wherein
the first adhesive member is formed into discrete island-like parts, and
the third adhesive member is formed into a continuous body.

* * * * *